United States Patent
Hsu et al.

(10) Patent No.: US 8,219,883 B2
(45) Date of Patent: Jul. 10, 2012

(54) DATA ACCESSING METHOD, CONTROLLER AND STORAGE SYSTEM USING THE SAME

(75) Inventors: Chih-Jen Hsu, Hsinchu County (TW); Yi-Hsiang Huang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 1035 days.

(21) Appl. No.: 12/165,123

(22) Filed: Jun. 30, 2008

(65) Prior Publication Data

US 2009/0259916 A1  Oct. 15, 2009

(30) Foreign Application Priority Data

Apr. 10, 2008 (TW) .............................. 97113041 A

(51) Int. Cl.
*G11C 29/00* (2006.01)
(52) U.S. Cl. .................... 714/763; 714/779; 714/784
(58) Field of Classification Search .................. 714/763, 714/779, 784, 766, 736, 701, 719
See application file for complete search history.

(56) References Cited

U.S. PATENT DOCUMENTS

| | | | |
|---|---|---|---|
| 6,459,644 B2 | 10/2002 | Mizushima et al. | |
| 6,477,632 B1 | 11/2002 | Kikuchi | |
| 7,137,027 B2 | 11/2006 | Shiota et al. | |
| 7,240,272 B2 * | 7/2007 | Lee et al. | 714/766 |
| 7,296,213 B2 * | 11/2007 | Vainsencher et al. | 714/784 |
| 7,610,433 B2 * | 10/2009 | Randell et al. | 711/101 |
| 7,690,031 B2 * | 3/2010 | Ma et al. | 726/9 |
| 2007/0143569 A1 | 6/2007 | Sanders et al. | |
| 2007/0214312 A1 | 9/2007 | Tashiro et al. | 711/112 |

OTHER PUBLICATIONS

Chinese First Examination Report of China Application No. 200810096248.7, dated Aug. 9, 2010.
"Office Action of Taiwan Counterpart Application", issued on Nov. 30, 2011, p. 1-p. 10, in which the listed references were cited.

* cited by examiner

*Primary Examiner* — Fritz Alphonse
(74) *Attorney, Agent, or Firm* — J.C. Patents

(57) ABSTRACT

Data accessing method for a flash memory, and a controller and a storage system using the same are provided. The data accessing method includes reading data from a physical address of a flash memory according to a physical address to be read corresponding to a logical address to be read in a read command, and determining whether or not the read physical address is the physical address to be read. The data accessing method also includes transmitting the data only if the read physical address is the physical address to be read. Accordingly, it is possible to ensure the transmitted data is data to be accessed by the read command.

25 Claims, 4 Drawing Sheets

DATA ACCESSING METHOD, CONTROLLER AND STORAGE SYSTEM USING THE SAME

CROSS-REFERENCE TO RELATED APPLICATION

This application claims the priority benefit of Taiwan application serial no. 97113041, filed on Apr. 10, 2008. The entirety of the above-mentioned patent application is hereby incorporated by reference herein and made a part of specification.

BACKGROUND

1. Technology Field

The present invention relates to a data accessing method, and a controller and a storage system using the same. More particularly, the present invention relates to a data accessing method for a flash memory, and a controller and a storage system using the same.

2. Description of Related Art

Recently, with quick development of digital cameras, mobile phones with a camera function, MP3 and MP4, demanding of storage media by consumer is increased greatly. As to all the storage medias, since a flash memory has the advantages of non-volatile, energy saving, small size and none mechanical structure, etc., it is suitable for the aforementioned portable multimedia devices. Particularly, a solid state drive (SSD) applying the flash memory as a storage media thereof may effectively reduce a size of a laptop computer. Therefore, the flash drive industry becomes a hot industry within the electronics industry recently.

Generally, a mapping table recording a mapping relation of logical blocks and physical blocks is stored in a storage system of the flash memory. When a host is about to access an address of a certain logical block (such as a page address), the storage system may write data into an address of a corresponding physical block or read data from the address of the corresponding physical block according to the mapping table. However, with increasingly sophisticated fabrication processes, minor noises generated during transmission of signal commands may influence content of data or commands, and accordingly errors of data accessing may be occurred. In a conventional technique, an error correcting code (ECC) is generally used for correcting the error of the accessed data. However, as to a transmitted command, there is no mechanism that may ensure correctness thereof. For example, when a storage system transmits a read command to access a physical address 1 corresponding to a logical address 1 to be read by the host, such read command may be misjudged to be a read command that requires to read a physical address 2 due to noises occurred during transmission thereof, and data of the physical address 2 may be accordingly transmitted to the host. In such case, though correctness of the transmitted data is verified via the ECC mechanism, and is transmitted to the host, since the read address is misjudged, the host does not receive a correct data to be read. In other words, under the conventional technique, the storage system cannot ensure whether or not a read address is the address to be read by the host, and therefore correctness of the read data cannot be ensured. Particularly, as to the SSD requiring high data reliability and data correctness, solving the aforementioned problem is very important.

SUMMARY

The present invention is directed to a data accessing method, which may ensure that data may be read from a correct physical address of a flash memory.

The present invention is directed to a controller, in which a plurality of data accessing steps is executed to ensure that data may be read from a correct physical address of a flash memory.

The present invention is directed to a storage system, in which a plurality of data accessing steps is executed to ensure that data may be read from a correct physical address of a flash memory.

The present invention provides a data accessing method adapted to a flash memory, the data accessing method includes reading data from a physical address of a flash memory according to a physical address to be read corresponding to a logical address to be read in a read command, and determining whether or not the read physical address is the physical address to be read. The data accessing method also includes transmitting main data stored in the read physical address if the read physical address is the physical address to be read. The present invention provides a controller adapted to a storage system having a flash memory.

In an embodiment of the present invention, the data accessing method further includes generating a checking code according to a physical address to be written in the flash memory corresponding to a logical address in a write command and the logical address in the write command, and writing the generated checking code, the logical address in the write command and main data to be written into the physical address to be written. The data accessing method also includes reading the checking code and the logical address from the read physical address, and determining whether or not the read physical address is the physical address to be read according to the checking code and the logical address from the read physical address.

In an embodiment of the present invention, the data accessing method further includes executing a cycle redundancy check (CRC) code generating procedure to generate the checking code.

In an embodiment of the present invention, the data accessing method further includes storing the generated checking code and the logical address in the write command into a redundant area of the physical address to be written.

In an embodiment of the present invention, the data accessing method further includes generating an ECC according to the generated checking code, the logical address in the write command and the main data to be written, and writing the generated ECC into the physical address to be written.

In an embodiment of the present invention, the data accessing method further includes determining whether or not the checking code, the logical address and the main data read from the read physical address are correct according to the ECC read from the read physical address, wherein when the checking code, the logical address and the main data read from the read physical address are incorrect, an error correction procedure is performed for the checking code, the logical address and the main data read from the read physical address.

In an embodiment of the present invention, the data accessing method further includes re-reading a physical address in the flash memory according to the physical address to be read when the read physical address is not the physical address to be read.

In an embodiment of the present invention, the data accessing method further includes generating a checking code according to a physical address in the flash memory to be written corresponding to the logical address in the write command, and writing the generated checking code and main data to be written into the physical address to be written. The data accessing method further includes reading the checking code from the read physical address, and determining whether or not the read physical address is the physical address to be read according to the checking code read from the read physical address.

The controller includes a flash memory interface, a buffer memory, a micro-processor and an address verification module. The flash memory interface is used for accessing the flash memory. The buffer memory is used for temporarily storing data. The micro-processor is coupled to the flash memory interface and the buffer memory, and is used for reading data from a physical address of a flash memory according to a physical address to be read corresponding to a logical address to be read in a read command. The address verification module is coupled to the micro-processor and is used for determining whether or not the read physical address is the physical address to be read, wherein the micro-processor transmits the main data stored in the read physical address if the read physical address is the physical address to be read.

In an embodiment of the present invention, the address verification module further includes a checking code generation unit and a check unit. The checking code generation unit is coupled to the micro-processor and is used for generating a checking code according to a logical address in a write command and a physical address in the flash memory to be written corresponding to the logical address in the write command, wherein the micro-processor writes the generated checking code, the logical address in the write command and the main data to be written into the physical address to be written. The check unit is coupled to the micro-processor, and is used for determining whether or not the read physical address is the physical address to be read according to the checking code and the logical address read from the read physical address memory by the micro-processor.

In an embodiment of the present invention, the checking code generation unit is a cycle redundancy check (CRC) code generation unit, and the check unit is a CRC check unit.

In an embodiment of the present invention, the generated checking code and the logical address in the write command are storing in a redundant area of the physical address to be written.

In an embodiment of the present invention, the controller further includes an error correction module coupled to the micro-processor for generating an error correcting code (ECC) according to the generated checking code, the logical address in the write command and the main data to be written, wherein the micro-processor may write the generated ECC into the physical address to be written.

In an embodiment of the present invention, the error correction module may determine whether or not the checking code, the logical address and the main data read from the read physical address are correct according to the ECC read from the read physical address, and may perform an error correction procedure for the checking code, the logical address and the main data read from the read physical address when the checking code, the logical address and the main data read from the read physical address are incorrect.

In an embodiment of the invention, the micro-processor may re-read a physical address in the flash memory according to the physical address to be read when the check unit judges that the read physical address is not the physical address to be read.

In an embodiment of the present invention, the storage system is a USB flash drive, a memory card or a solid state drive (SSD).

In an embodiment of the present invention, the address verification module further includes a checking code generation unit and a check unit. The checking code generation unit is coupled to the micro-processor and is used for generating a checking code according to a physical address in the flash memory to be written corresponding to a logical address in the write command, wherein the micro-processor writes the generated checking code and main data to be written into the physical address to be written. The check unit is coupled to the micro-processor, and is used for determining whether or not the read physical address is the physical address to be read according to the checking code read from the read physical address by the micro-processor.

The present invention provides a storage system including a flash memory, a transmission interface and a controller. The flash memory is used for storing data, and the transmission interface is used for connecting a host. The controller is coupled to the flash memory and the transmission interface, and is used for reading data from a physical address of a flash memory according to a physical address to be read corresponding to a logical address in a read command, determining whether or not the read physical address is the physical address to be read, and transmitting main data read from the read physical address if the read physical address is the physical address to be read.

In an embodiment of the present invention, the controller is further used for generating a checking code according to a physical address in the flash memory to be written corresponding to a logical address in a write command, and writing the generated checking code and main data to be written into the physical address to be written. The controller is further used for reading the checking code and the logical address from the read physical address of the flash memory, and determining whether or not the read physical address is the physical address to be read according to the checking code and the logical address read from the read physical address.

In an embodiment of the present invention, the checking code is a CRC code.

In an embodiment of the present invention, the generated checking code and the logical address in the write command are stored in a redundant area of the physical address to be written.

In an embodiment of the present invention, the controller is further used for generating an ECC according to the generated checking code, the logical address in the write command and the main data to be written, and writing the generated ECC into the physical address to be written.

In an embodiment of the present invention, the controller is further used for determining whether or not the checking code, the logical address and the main data read from the read physical address are correct according to the ECC read from the read physical address, wherein the checking code, the logical address and the main data read from the read physical address are corrected when they are incorrect.

In an embodiment of the present invention, the controller is further used for re-reading a physical address in the flash memory according to the physical address to be read when the read physical address is not the physical address to be read.

In an embodiment of the present invention, the controller is further used for generating the checking code according to a physical address in the flash memory to be written corresponding to a logical address in a write command, and writing the generated checking code and main data to be written into the physical address to be written. The controller is further used for reading the checking code from the read physical address, and determining whether or not the read physical address is the physical address to be read according to the checking code read from the read physical address.

Since the address verification module is applied in the storage system in the present invention, whether or not the read physical address is the physical address to be read in the read command then may be verified, and therefore correctness of the read data is then guaranteed.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A controller of a storage system provided by the present invention includes an address verification module, wherein when a micro-processor of the controller reads data from a physical address of a flash memory, the address verification module checks whether or not the read physical address is a physical address to be read in a read command, and when the address verification module judges the read physical address is the physical address to be read, may the micro processing transmit a read data. Therefore, transmitting of data in a physical address not to be read by a host may be prevented. In the following content, embodiments accompanying with drawings are provided for describing the present invention in detail.

[First Embodiment]

Figure 1:
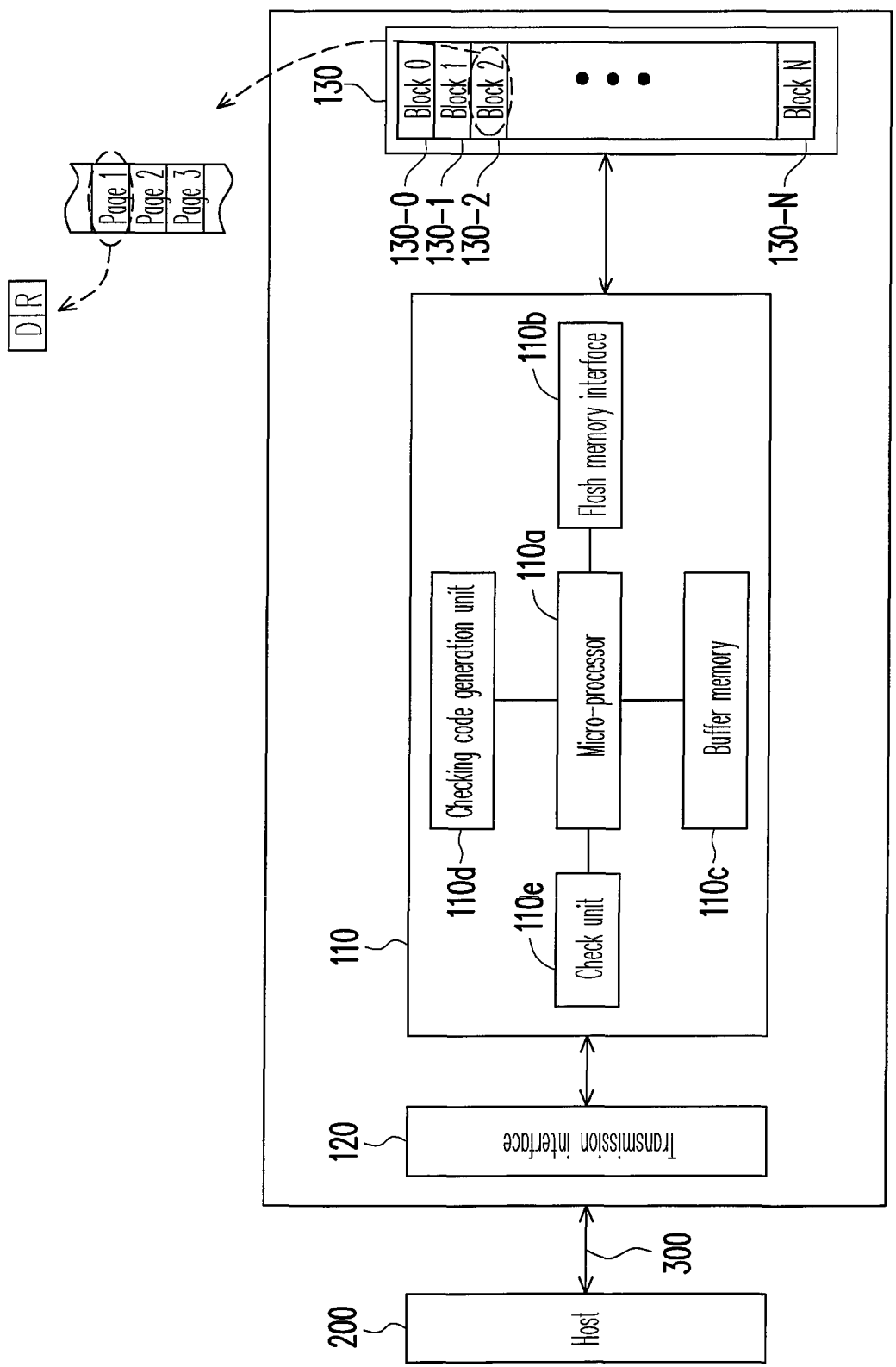
FIG. 1 is a schematic diagram illustrating a storage system according to a first embodiment of the present invention.

FIG. 1 is a schematic diagram illustrating a storage system according to a first embodiment of the present invention. Referring to FIG. 1, the storage system 100 includes a controller 110, a transmission interface 120 and a flash memory 130. The storage system 100 is generally utilized together with a host 200, so that the host 200 may write data into the storage system 100 or read data from the storage system 100. In the present embodiment, the storage system 100 is a solid state drive (SSD). It should be understood that in another embodiment the storage system 100 may also be a flash drive or a memory card.

The controller 110 may coordinate a whole operation (for example, write, read and erase, etc. of data) of the transmission interface 120 and the flash memory 130. The controller 110 includes a micro-processor 110a, a flash memory interface 110b, a buffer memory 110c and an address verification module including a checking code generation unit 110d and a check unit 110e.

The micro-processor 110a may perform write, read and erase operations for the flash memory 130.

The flash memory interface 110b is electrically connected to the micro-processor 110a and is used for accessing the flash memory 130. Namely, data to be written into the flash memory 130 by the host 200 is transformed into a format that may be accepted by the flash memory 130 by the flash memory interface 110b.

The buffer memory 110c is electrically connected to the micro-processor 110a and is used for temporarily storing system data (for example, a mapping table recording the mapping relationship between logical blocks and physical blocks) or data to be read or written by the host 200. In the present embodiment, the buffer memory 110c is a static random access memory (SRAM). However, it should be noted that the present invention is not limited thereto, and a dynamic random access memory (DRAM), a magnetoresistive random access memory (MRAM), a phase change random access memory (PRAM) or other suitable memories may also be applied.

The checking code generation unit 110d is electrically connected to the micro-processor 110a for generating a checking code. To be specific, the micro-processor 110a generates the checking code according to a logical address to be written and a corresponding physical address in the flash memory 130 thereof, wherein the logical address to be written and the corresponding physical address have a fixed relation with the checking code. For example, the generated checking code is a remainder of the logical address to be written divided by the corresponding physical address. In the present embodiment, the checking code generation unit 110d is embodied by a cycle redundancy check (CRC) generation circuit, and therefore the generated checking code thereof is also referred to as a CRC code.

It should be noted that in the present embodiment, the micro-processor may write a redundant data including the CRC code and the logical address to be written and the data to be written into the physical address corresponding to the logical address, together.

The check unit 110e is electrically connected to the micro-processor 110a and is used for determining whether or not the read data is the data in the physical address to be read according to the checking code and the logical address of the redundant data in the physical address read by the processing unit 110a. To be specific, when the micro-processor 110a sends a command to read data (referred to as main data hereinafter) from a certain physical address, the flash memory interface 110b simultaneously reads the main data and the redundant data (i.e. the checking code and the logical address) from the physical address of the flash memory 130 according to the command. When the micro-processor 110a receives the read data, the check unit 110e determines whether or not the redundant data including the checking code and the logical address are matched to the physical address to be read. In the present embodiment, the check unit 110e is a CRC decoding circuit corresponding to the CRC generation circuit of the checking code generation unit 110d.

It should be noted that implementing of the checking code generation unit 110d and the check unit 110e is not limited to the CRC generation circuit and the CRC decoding circuit in the present invention, and any suitable determination module may also be applied for implementing the function of the address verification module.

Moreover, though not illustrated, the controller 110 may further include functional modules of a general flash memory controller, such as a memory management module, a power supply management module, etc.

The transmission interface 120 is used for connecting the host 200 via a bus 300. In the present embodiment, the transmission interface 120 is a PCI express interface. However, it should be understood that the present invention is not limited thereof, and the transmission interface 120 may also be a USB interface, an IEEE 1394 interface, a SATA interface, an MS interface, an MMC interface, an SD interface, a CF interface, an IDE interface or other suitable data transmission interfaces.

The flash memory 130 is electrically connected to the controller 110 and is used for storing data. In the present embodiment, the flash memory 130 is a multi level cell (MLC) NAND flash memory. However, it should be understood that the present invention is not limited thereof. In another embodiment, a single level cell (SLC) NAND flash memory may also be applied.

The flash memory 130 is generally divided into a plurality of physical blocks 130-0 to 130-N. For convenience, the physical blocks are referred to as blocks. Generally, the block is a minimum unit that may be erased within the flash memory. Namely, each block contains a minimum number of memory cells that may be erased together. Each block is generally divided into a plurality of pages, and the page is the minimum unit that may be programmed. It should be noted that according to different designs of the flash memory, the minimum programmable unit may also be a sector, namely, the page may be divided into a plurality of the sectors, and the sector is the minimum unit that may be programmed. In other words, the page is the minimum unit that data may be written on or read from. In the present embodiment, the physical address represents a page of the flash memory.

Each page generally includes a data area D and a redundant area R. The data area is used for storing a user data, and the redundant area is used for storing a system data (for example, the CRC checking code, and an error correcting code (ECC), etc.). The data area D usually has 512 bytes and the redundant area R usually has 16 bytes in order to correspond to the size of a sector in a disk driver. Namely, one page is one sector. However, the page may also include a plurality of the sectors, for example, one page may include 4 sectors.

Generally, the block may include arbitrary number of pages, for example, 64 pages, 128 pages, 256 pages etc. The blocks 130-0~130-N are generally grouped into a plurality of zones, and managing of the memory based on the zones results in the fact that the zones may be operated independently, so as to increase a parallel degree of operation, and simplify a complexity of management.

Accordingly, the storage system 100 of the present embodiment may determine whether or not the read physical address is the physical address to be read via the checking code generation unit 110d and the check unit 110e, so as to ensure correctness of the read data. In the following content, data accessing of the storage system 100 is described in detail with reference of FIG. 2.

Figure 2:
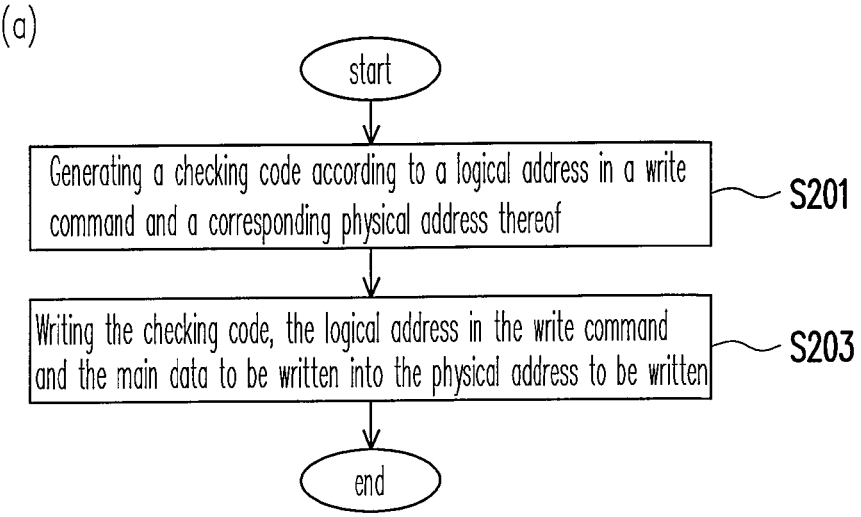
FIG. 2 is a flowchart illustrating a data accessing method according to a first embodiment of the present invention.
Figure 2:
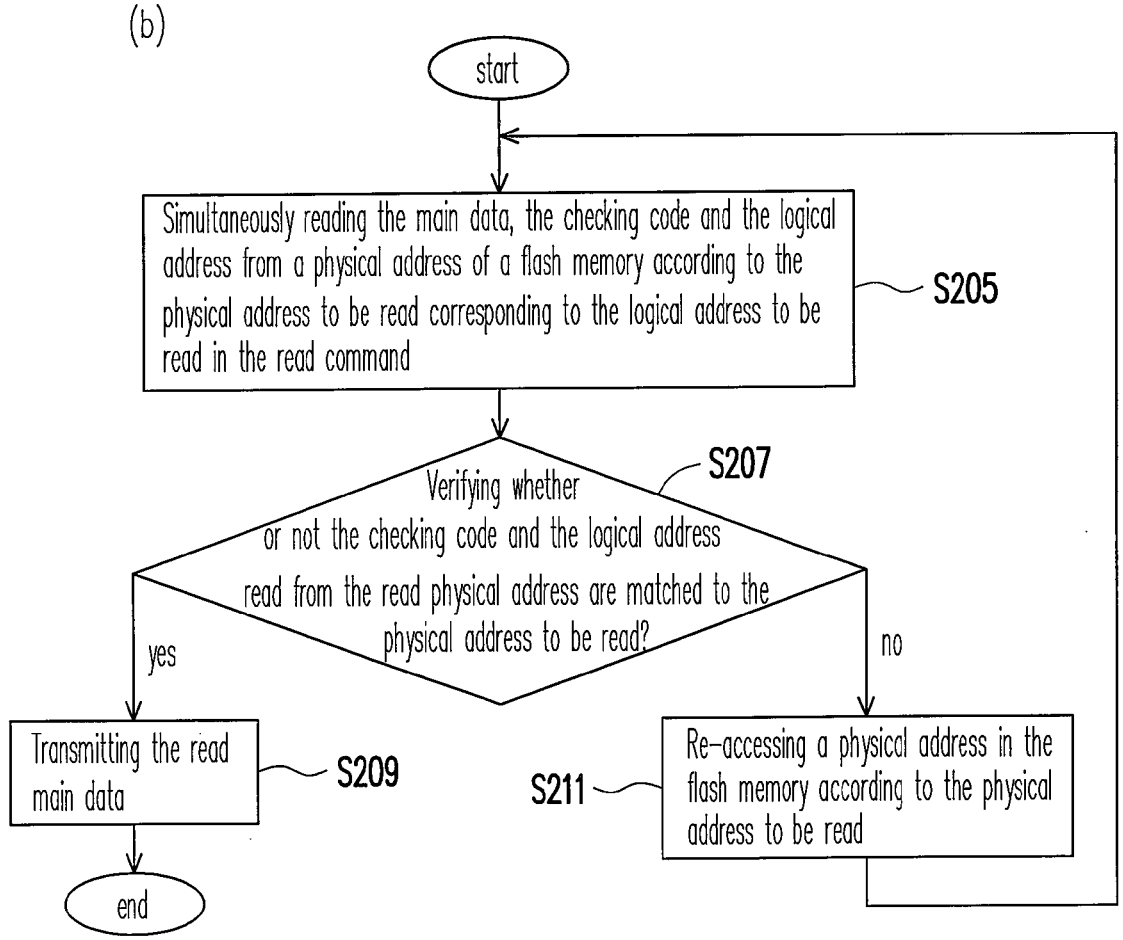

FIG. 2 is a flowchart illustrating a data accessing method according to a first embodiment of the present invention.

Referring to (a) of FIG. 2, when the host 200 sends a write command to the storage system 100 for writing data (referred to as main data hereinafter) into the flash memory 130, the micro-processor 110a transmits a logical address in the write command and a corresponding physical address in the flash memory 130 to the checking code generation unit 110d, and the checking code generation unit 110d consequently generates a checking code (step S201).

Next, the generated checking code, the logical address in the write command and the main data are written into the corresponding physical address together via the flash memory interface 110b (step S203). To be specific, the micro-processor 110a writes the main data into the data area D of the corresponding physical address, and writes the redundant data including the checking code and the logical address to be written into the redundant area R of the corresponding physical address.

Next, referring to (b) of FIG. 2, when the host 200 sends a read command to the storage system 100 for reading the main data stored in the flash memory 130, the micro-processor 110a simultaneously reads a main data, a checking code and a logical address from a physical address of the flash memory 130 according to the physical address to be read corresponding to the logical address in the read command (step S205).

The checking codes and the logical address read from the read physical address are transmitted to the check unit 110e to determine whether or not the checking code and the logical address read from the read physical address are matched to the physical address to be read (step S207).

If the check unit 110e judges that the checking code and the logical address read from the read physical address are matched to the physical address to be read in the step S207, the main data read from the read physical address then may be judged to be data stored in the physical address to be read by the host 200, and therefore in step S209, the micro-processor 110a then transmits the main data read from the read physical address to the host 200.

If the check unit 110e judges that the checking code and the logical address read from the read physical address are not matched to the physical address to be read in the step S207, in step S211, the micro-processor 110a then re-accesses a physical address in the flash memory 130 according to the physical address to be read by the read command, and the step S205 is re-executed. Alternatively, in another embodiment, when the check unit 110e judges that the checking code and the logical address read from the read physical address are not matched to the physical address to be read, the micro-processor 110a may generate a read error message for notifying the host 200.

Accordingly, the storage system 100 of the present embodiment may judge whether or not the read physical address is matched to the physical address to be read by the read command, so that correctness of the read data is ensured.

It should be noted that in the present embodiment, the checking code is generated based on the logical address in the write command and the corresponding physical address in the flash memory, and whether or not the read physical address is the physical address to be read is determined according to the logical address and the checking codes stored in the read physical address. However, in another embodiment of the present invention, the checking code may also be generated only according to the physical address in the flash memory corresponding to the logical address in the write command, and whether or not the read physical address is the physical address to be read may be determined only according to the checking code stored in the read physical address. Moreover, in the other embodiment of the present invention, the physical address in the flash memory corresponding to the logical address in the write command may also be directly regarded as the checking code for judging whether or not the read physical address is the physical address to be read.

Second Embodiment

As described above, to ensure correctness of the read data, it is optimal to confirm correctness of a source address and correctness of the read data itself. In the storage system 100 of the first embodiment, only the correctness of the source address is confirmed. However, to fully convey the spirit of the present invention, the protection mechanism of confirming the source address may also be applied together with a mechanism of confirming the content of the read data.

Figure 3:
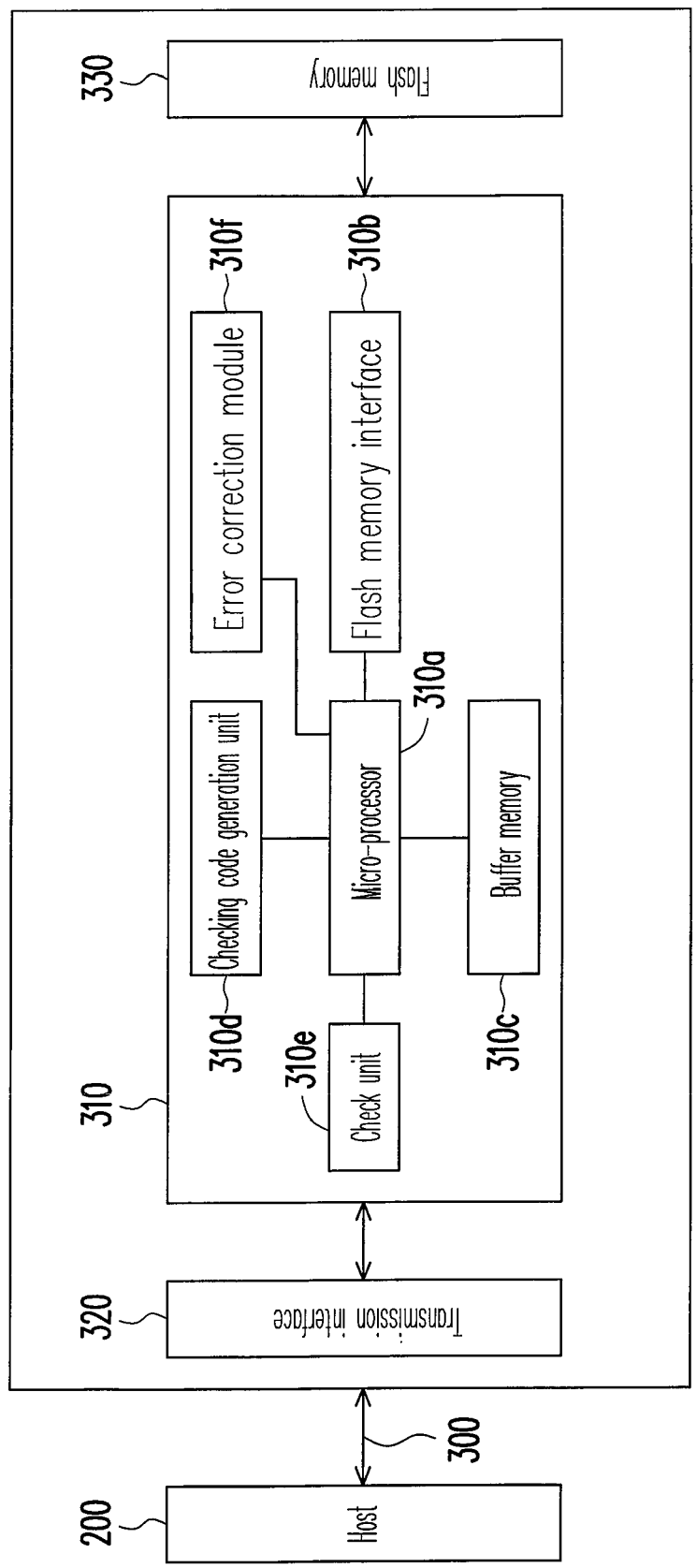
FIG. 3 is a block diagram illustrating a storage system according to a second embodiment of the present invention.

FIG. 3 is a block diagram illustrating a storage system according to a second embodiment of the present invention. Referring to FIG. 3, the storage system 100' includes a controller 310, a transmission interface 320 and a flash memory 330. The storage system 100' is generally utilized together with a host 200, so that the host 200 may write data into the storage system 100' or read data from the storage system 100'. In the present embodiment, the storage system 100' is the SSD. It should be understood that in another embodiment the storage system 100' may also be a flash drive or a memory card. Structures and operations of the transmission interface 320 and the flash memory 330 are the same to that of the transmission interface 120 and the flash memory 130 of the first embodiment, and therefore detailed description thereof will not be repeated.

The controller 310 may coordinate a whole operation (for example, write, read and erase, etc. of data) of the transmission interface 320 and the flash memory 330. The controller 310 includes a micro-processor 310a, a flash memory interface 310b, a buffer memory 310c, a checking code generation unit 310d, a check unit 310e and an error correction module 310f.

Structures of the micro-processor 310a, the flash memory interface 310b, the buffer memory 310c, the checking code generation unit 310d and check unit 310e are similar to that of the micro-processor 110a, the flash memory interface 110b, the buffer memory 110c, the checking code generation unit 110d and check unit 110e of the first embodiment, and operation differences thereof are described in the following content with reference of FIG. 4.

The error correction module 310f is coupled to the micro process unit 310a, and is used for performing an error correction encoding for data packets to be stored in the flash memory 330, and generating an ECC. Particularly, the generated ECC may be written into the flash memory 330 together with the data packets to be stored. Namely, the ECC may be written into the redundant area R of the physical address. Moreover, the error correction module 310f is further used for checking and correcting errors or noises of the data packets probably generated during transmission according to the recorded ECC.

In the storage system 100' of the present embodiment, whether or not the read physical address is the physical address to be read and correctness of the read data may be confirmed via operations of the checking code generation unit 310d, the check unit 310e and the error correction module 310f, so as to further guarantee the correctness of the read data. In the following content, data accessing method of the storage system 100' is described in detail with reference of FIG. 4.

Figure 4:
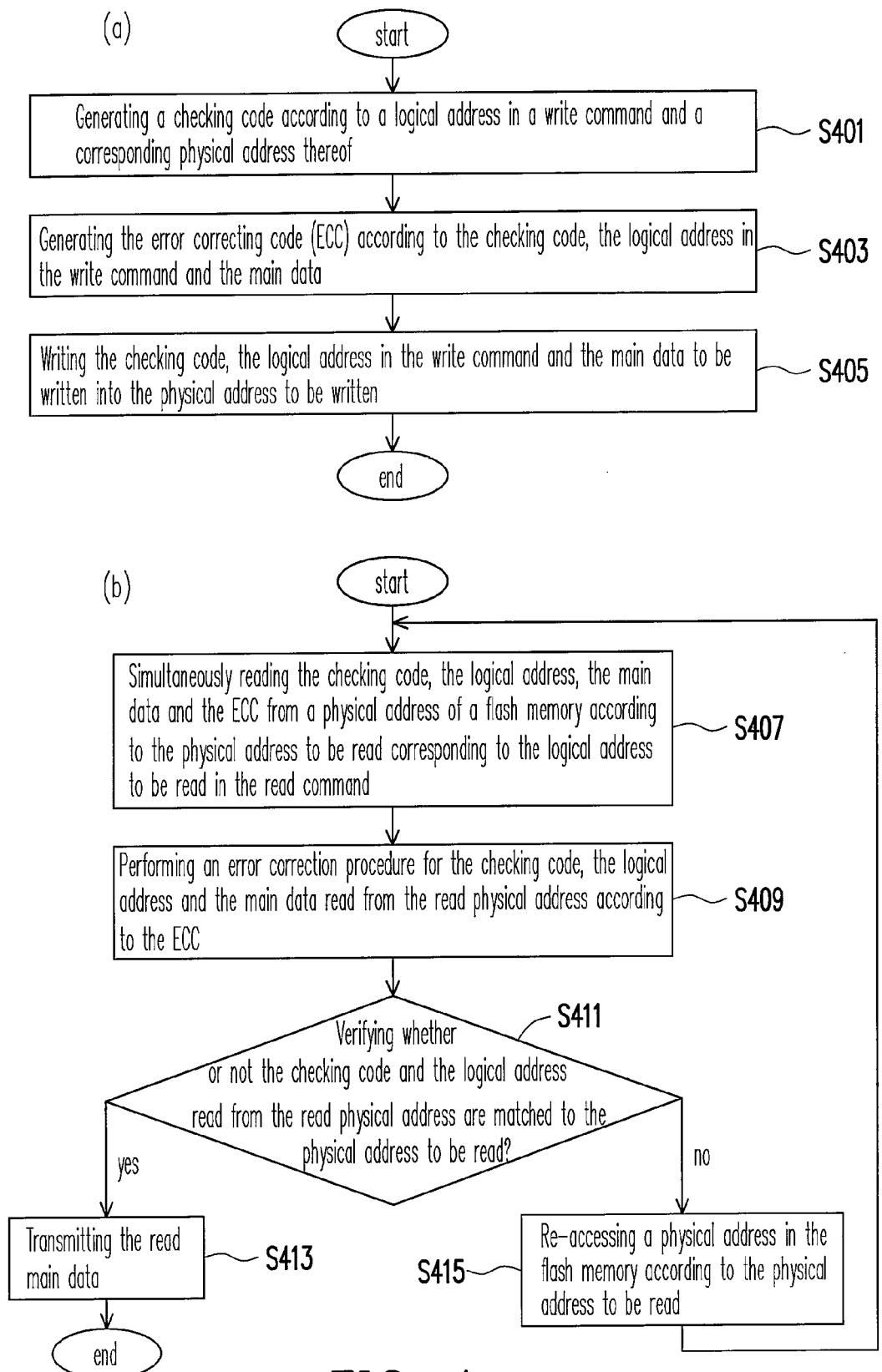
FIG. 4 is a flowchart illustrating a data accessing method according to a second embodiment of the present invention.

FIG. 4 is a flowchart illustrating a data accessing method according to a second embodiment of the present invention.

Referring to (a) of FIG. 4, when the host 200 sends a write command to the storage system 100' for writing data (referred to as main data hereinafter) into the flash memory 330, the micro-processor 310a transmits a logical address in the write command and a corresponding physical address in the flash memory 330 to the checking code generation unit 310d, and the checking code generation unit 310d consequently generates a checking code (step S401).

Next, the generated checking code, the logical address in the write command and the main data are transmitted to the error correction module 310f, and the error correction module 310f correspondingly generates an ECC (step S403).

The checking code, the logical address in the write command, the main data and the generated ECC are written into the corresponding physical address of the flash memory 330 together via the flash memory interface 310b (step S405). To be specific, the micro-processor 310a writes the main data into a data area of the corresponding physical address, and writes the redundant data including the generated checking code and the logical address in the write command, and the generated ECC into a redundant area of the corresponding physical address.

Next, referring to (b) of FIG. 4, when the host 200 sends a read command to the storage system 100' for reading the main data stored in the flash memory 330, the micro-processor 310a simultaneously reads a checking code, a logical address, main data and a ECC from a physical address of the flash memory 330 via the flash memory interface 310b according to the physical address to be read corresponding to the logical address in the read command (step S407).

The checking codes, the logical address, the main data and the ECC from the read physical address are transmitted to the error correction module 310f, and the error correction module 310f performs an error correction procedure to determine whether or not the checking code, the logic address and the main data read from the read physical address are correct based on the ECC read from the read physical address, and corrects an error if there is any (step S409).

Next, the error-corrected checking codes, the error-corrected logical address and the error-corrected main data are transmitted to the check unit 310e to determine whether or not the error corrected checking code and the error-corrected logical address are matched to the physical address to be read (step S411).

If the check unit 310e judges that the error-corrected checking code and the error-corrected logical address are matched to the physical address to be read in the step S411, and the error-corrected main data is confirm to be the data stored in the physical address to be read by the host 200, in step S413, the micro-processor 310a then transmits the error-corrected main data to the host 200.

If the check unit 310e judges that the error-corrected checking code and the error-corrected logical address in the read redundant data are not matched to the physical address to be read in the step S411, in step S415, the micro-processor 310a then re-accesses a physical address in the flash memory 130 according to the physical address to be read by the read command, and the step S407 is re-executed. Alternatively, in another embodiment, when the check unit 310e judges that the error-corrected checking code and error-corrected the logical address are not matched to the physical address to be read, the micro-processor 310a may generate a read error message for notifying the host 200.

Accordingly, the storage system 100' of the present embodiment may judge whether or not the read physical address is matched to the physical address to be read by the read command via the check unit 310e, and whether or not the read data is correct may be judged by the error correction module 310f, so that correctness of the read data is further ensured.

In summary, the address verification module (which is embodied by the checking code generation unit and the check unit in the aforementioned embodiment, for example) is applied in the storage system in the present invention, so as to judge whether or not the read physical address is the physical address to be read by the host, and therefore correctness of data source is then guaranteed. Moreover, the flash memory storage system further includes the error correction module for determining the content of the read data, so as to guarantee correctness of the read data itself. Accordingly, the flash memory storage system according to the present invention may effectively guarantee the correctness of the transmitted data.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data accessing method, adapted to a flash memory, the data accessing method comprising:
    reading data from a physical address of a flash memory according to a physical address to be read corresponding to a logical address to be read in a read command by a micro-processor;
    determining whether or not the read physical address is the physical address to be read by an address verification module; and
    transmitting main data stored in the physical address by the micro-processor if the read physical address is the physical address to be read.

2. The data accessing method as claimed in claim 1, further comprising:
    generating a checking code according to a physical address to be written in the flash memory corresponding to a logical address in a write command and the logical address in the write command;
    writing the generated checking code, the logical address in the write command and main data to be written into the physical address to be written;
    reading the checking code and the logical address stored in the read physical address; and
    determining whether or not the read physical address is the physical address to be read according to the read checking code.

3. The data accessing method as claimed in claim 2, further comprising executing a cycle redundancy check (CRC) code generation procedure to generate the checking code.

4. The data accessing method as claimed in claim 2, further comprising storing the generated checking code and the logical address in the write command into a redundant area of the physical address to be written.

5. The data accessing method as claimed in claim 2, further comprising:
    generating an error correcting code (ECC) according to the generated checking code, the logical address in the write command and the main data to be written; and
    writing the generated ECC into the physical address to be written.

6. The data accessing method as claimed in claim 5, further comprising:
    determining whether or not the checking code, the logical address and the main data read from the read physical address are correct according to the ECC read from the read physical address,
    wherein when the checking code, the logical address and the main data read from the read physical address are incorrect, an error correction procedure is performed for the checking code, the logical address and the main data read from the read physical address.

7. The data accessing method as claimed in claim 2, further comprising re-reading a physical address in the flash memory according to the physical address to be read when the read physical address is not the physical address to be read.

8. The data accessing method as claimed in claim 1, further comprising:
    generating a checking code according to a physical address to be written in the flash memory corresponding to the logical address in the write command;
    writing the generated checking code and main data to be written into the physical address to be written;
    reading the checking code stored in the read physical address of the flash memory; and
    determining whether or not the read physical address is the physical address to be read according to the checking code read from the read physical address.

9. A controller, adapted to a storage system having a flash memory, the controller comprising:
    a flash memory interface, for accessing the flash memory;
    a buffer memory, for temporarily storing data;
    a micro-processor, coupled to the flash memory interface and the buffer memory, for reading data from a physical address of a flash memory according to a physical address to be read corresponding to a logical address to be read in a read command; and
    an address verification module, coupled to the micro-processor for determining whether or not the read physical address is the physical address to be read,
    wherein the micro-processor transmits a main data stored in the physical address when a check unit judges the read physical address is the physical address to be read.

10. The controller as claimed in claim 9, wherein the address verification module comprises:
    a checking code generation unit, coupled to the micro-processor for generating a checking code according to a physical address to be written in the flash memory corresponding to a logical address in a write command and the logical address in the write command, wherein the micro-processor writes the generated checking code, the logical address in the command and main data to be written into the physical address to be written; and
    a check unit, coupled to the micro-processor for determining whether or not the read physical address is the physical address to be read according to the checking code and the logical address read from the read physical address of the flash memory by the micro-processor.

11. The controller as claimed in claim 10, wherein the checking code generation unit is a CRC code generation unit, and the check unit is a CRC check unit.

12. The controller as claimed in claim 10, wherein the generated checking code and the logical address in the write command are stored in a redundant area of the physical address to be written.

13. The controller as claimed in claim 10, further comprising an error correction module coupled to the micro-processor for generating an ECC according to the generated checking code, the logical address in the write command and the main data to be written,
    wherein the micro-processor writes the generated ECC into the physical address to be written.

14. The controller as claimed in claim 10, wherein the error correction module determines whether or not the checking code, the logical address and the main data read from the read physical address are correct according to the ECC read from the read physical address, and performs an error correction procedure for the checking code, the logical address and the main data read from the read physical address when the checking code, the logical address and the main data read from the read physical address are incorrect.

15. The controller as claimed in claim 10, the micro-processor re-reads a physical address in the flash memory according to the physical address to be read wherein when the check unit judges the read physical address is not the physical address to be read.

16. The controller as claimed in claim 9, wherein the storage system is a USB flash drive, a memory card or a solid state drive.

17. The controller as claimed in claim 9, wherein the address verification module comprises:
- a checking code generation unit, coupled to the micro-processor for generating a checking code according to a physical address to be written in the flash memory corresponding to a logical address in a write command, wherein the micro-processor writes the generated checking code and main data to be written into the physical address to be written; and
- a check unit, coupled to the micro-processor for determining whether or not the read physical address is the physical address to be read according to the checking code read from the read physical address by the micro-processor.

18. A storage system, comprising:
- a flash memory, for storing data;
- a transmission interface, for connecting a host; and
- a controller, coupled to the flash memory and the transmission interface for reading data from a physical address of a flash memory according to a physical address to be read corresponding to a logical address to be read in a read command, determining whether or not the read physical address is the physical address to be read, and transmitting main data stored in the read physical address if the read physical address is the physical address to be read.

19. The storage system as claimed in claim 18, wherein the controller is further used for generating a checking code according to a logical address in a write command and a physical address to be written in the flash memory corresponding to the logical address in the write command, and writing the generated checking code, the logical address in the write command and main data to be written into the physical address to be written; and
  the controller is further used for reading the checking code and the logical address from the read physical address of the flash memory, and determining whether or not the read physical address is the physical address to be read according to the checking code and the logical address read from the read physical address.

20. The storage system as claimed in claim 19, wherein the checking code is a CRC code.

21. The storage system as claimed in claim 19, wherein the generated checking code and the logical address in the write command are stored in a redundant area of the physical address to be written.

22. The storage system as claimed in claim 19, wherein the controller is further used for generating an ECC according to the generated checking code, the logical address in the write command and the main data to be written, and writing the generated ECC into the physical address to be written.

23. The storage system as claimed in claim 22, wherein the controller is further used for determining whether or not the checking code, the logical address and the main data read from the read physical address are correct according to the ECC read from the read physical address, and performing an error correction procedure for the checking code, the logical address and the main data read from the read physical address by the error correction module when the checking code, the logical address and the main data read from the read physical address are incorrect.

24. The storage system as claimed in claim 19, wherein the controller is further used for re-reading a physical address in the flash memory according to the physical address to be read when the read physical address is not the physical address to be read.

25. The storage system as claimed in claim 18, wherein the controller is further used for generating a checking code according to a physical address to be written in the flash memory corresponding to a logical address in a write command, and writing the generated checking code and main data to be written into the physical address to be written; and
  the controller is further used for reading the checking code from the read physical address of the flash memory, and determining whether or not the read physical address is the physical address to be read according to the checking code read from the read physical address.

* * * * *